US009890296B2

(12) United States Patent
Matsuzaki et al.

(10) Patent No.: US 9,890,296 B2
(45) Date of Patent: Feb. 13, 2018

(54) COATING MATERIAL FOR ELECTRICAL EQUIPMENT, METHOD FOR MANUFACTURING COATING MATERIAL FOR ELECTRICAL EQUIPMENT, AND CLOSED INSULATING DEVICE (71) Applicant: KABUSHIKI KAISHA TOSHIBA, Minato-ku (JP)

(72) Inventors: Hidehito Matsuzaki, Yokohama (JP); Hisashi Kusumori, Itabashi (JP); Kenichi Nojima, Yokohama (JP); Toshiyuki Nakano, Yokohama (JP); Masafumi Takei, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 78 days.

(21) Appl. No.: 14/861,452

(22) Filed: Sep. 22, 2015

(65) Prior Publication Data
US 2016/0009948 A1    Jan. 14, 2016

Related U.S. Application Data (63) Continuation of application No. PCT/JP2013/005173, filed on Sep. 2, 2013.

(30) Foreign Application Priority Data

Apr. 2, 2013 (JP) .................. 2013-076612

(51) Int. Cl.
*C09D 163/00* (2006.01)
*C09D 7/12* (2006.01)
(Continued)

(52) U.S. Cl.
CPC .............. *C09D 163/00* (2013.01); *B01F 3/14* (2013.01); *B01F 13/005* (2013.01); *C08K 3/22* (2013.01);
(Continued)

(58) Field of Classification Search
CPC ..... C08L 63/00–63/10; C09D 163/00–163/10; C09D 5/24;
(Continued)

(56) References Cited

U.S. PATENT DOCUMENTS 4,992,325 A    2/1991 Kim et al.
5,183,594 A    2/1993 Yoshinaka et al.
(Continued)

FOREIGN PATENT DOCUMENTS

CN    102277061 A    12/2011
CN    102341982 A    2/2012
(Continued)

OTHER PUBLICATIONS

Machine translation of JP 2012-142377 A.*
(Continued)

*Primary Examiner* — Kregg T Brooks
(74) *Attorney, Agent, or Firm* — Oblon, McClelland, Maier & Neustadt, L.L.P.

(57) ABSTRACT

There are provided a coating material for electrical equipment, a method for manufacturing a coating material for electrical equipment, and a closed insulating device, capable of suppressing floating and moving around of foreign substances in electrical equipment. A coating material for electrical equipment 20 in an embodiment includes: a matrix resin 50 composed of an epoxy resin; a first filler 10 dispersedly contained in the matrix resin 50 and composed of whiskers having a semiconductive specific volume resistivity; a second filler 30 dispersedly contained in the matrix resin 50 and composed of particles having a semiconductive specific volume resistivity; and a third filler 40 dispersedly contained in the matrix resin 50 and composed of a planar, fibrous, or lamellar substance having insulating properties.

9 Claims, 3 Drawing Sheets (51) Int. Cl.
*C09D 5/24* (2006.01)
*C09D 7/14* (2006.01)
*H02B 13/055* (2006.01)
*B01F 13/00* (2006.01)
*B01F 3/14* (2006.01)
*C08K 3/22* (2006.01)
*C08K 3/28* (2006.01)
*C08K 3/34* (2006.01)
*C08K 7/14* (2006.01)
*H02G 5/06* (2006.01)
*H02G 5/08* (2006.01)
*H01C 7/10* (2006.01)
*B01F 3/12* (2006.01)

(52) U.S. Cl.
CPC .............. *C08K 3/28* (2013.01); *C08K 3/34* (2013.01); *C08K 7/14* (2013.01); *C09D 5/24* (2013.01); *H02B 13/055* (2013.01); *B01F 2003/1278* (2013.01); *C08K 2003/2237* (2013.01); *C08K 2003/2272* (2013.01); *C08K 2003/2275* (2013.01); *C08K 2003/2296* (2013.01)

(58) Field of Classification Search
CPC ......... C09J 163/00–163/10; C08K 2003/2272; C08K 2003/2275; C08K 2003/2296; C08K 2003/2265; C08K 3/22; C08K 3/28; C08K 3/34; H02B 13/035–13/075
See application file for complete search history.

(56) References Cited

U.S. PATENT DOCUMENTS

2002/0058778 A1* 5/2002 Konarski ........... C08G 59/4014
528/94

2015/0325344 A1* 11/2015 Matsuzaki ........... C09D 175/04
252/62.3 Q

FOREIGN PATENT DOCUMENTS

| | | | |
|---|---|---|---|
| EP | 2 405 550 A1 | | 1/2012 |
| JP | 5-179013 A | | 7/1993 |
| JP | 11-60912 A | | 3/1999 |
| JP | 3028975 B2 | | 4/2000 |
| JP | 2006-057017 A | | 3/2006 |
| JP | 2007-056049 A | | 3/2007 |
| JP | 2010-8254 A | | 1/2010 |
| JP | 2010-207047 A | | 9/2010 |
| JP | 2012-142377 A | | 7/2012 |
| KR | 10-2011-0118818 A | | 11/2011 |
| KR | 20130141857 A | * | 12/2013 |
| RU | 2195474 C2 | | 12/2002 |
| WO | WO 2010/100818 A1 | | 9/2010 |

OTHER PUBLICATIONS

Machine translation of JP 2006-057017 A.*
Machine translation of KR 20130141857 A.*
International Preliminary Report on Patentability dated Oct. 15, 2015 in PCT/JP2013/005173 (English translation only).
Office Action dated May 31, 2016 in Japanese Patent Application No. 2013-076612 (with unedited computer generated English translation).
International Search Report dated Nov. 19, 2013 in PCT/JP2013/005173 filed Sep. 2, 2013, with English translation.
Written Opinion dated Nov. 19, 2013 in PCT/JP2013/005173 filed Sep. 2, 2013.
Office Action dated Mar. 17, 2017 in Russian Patent Application No. 2015146771 (with English Translation).

* cited by examiner

COATING MATERIAL FOR ELECTRICAL EQUIPMENT, METHOD FOR MANUFACTURING COATING MATERIAL FOR ELECTRICAL EQUIPMENT, AND CLOSED INSULATING DEVICE

CROSS-REFERENCE TO RELATED APPLICATIONS

This application is a continuation of prior International Application No. PCT/JP2013/005173 filed on Sep. 2, 2013, which is based upon and claims the benefit of priority from Japanese Patent Application No. 2013-076612 filed on Apr. 2, 2013; the entire contents of all of which are incorporated herein by reference.

FIELD

Embodiments described herein relate generally to a coating material for electrical equipment, a method for manufacturing a coating material for electrical equipment, and a closed insulating device.

BACKGROUND

A problem of a closed insulating device such as a gas-sealed switchgear in which a high-voltage conductor supported by an insulator is provided in a container having an insulating gas sealed therein, is miniaturization by rationalization of insulation design or three-phase integration for cost reduction and environmental load reduction.

The size of a metal container of the closed insulating device is decided by insulation design, thermal design or the like. One of points of the insulation design is to discuss the influence on the insulation performance in the case where foreign substances exist (adhere) on the inner surface of the metal container.

When foreign substances exist inside the metal container in which the high-voltage conductor supported by the insulator is housed and the insulating gas is sealed, force is generated to the foreign substances due to interaction between electric charges supplied from the metal container or the like and an operation voltage. Therefore, the foreign substances sometimes move around inside the metal container.

When the closed insulating device is miniaturized, the electric field on the inner surface of the metal container becomes high and the movement of the foreign substances existing inside the metal container are thus likely to become active. The foreign substances, if excessively moving inside the metal container, sometimes affect the insulation performance. Further, with a longer shape of the foreign substance, the foreign substance more greatly moves and thus more greatly affects the insulation performance.

For this reason, to prevent the long foreign substance from entering the inside of the metal container, for example, a foreign substance management process is provided to remove the foreign substances in a manufacturing process to thereby enhance the management of the foreign substances. Further, it is necessary to design the electric field intensity on the inner surface of the metal container at the application of the operation voltage to prevent a small foreign substance that is difficult to manage from floating to a height taken into consideration in design or higher and moving around. Here, the height means the distance between the inner surface of the metal container and the foreign substance.

The electric field intensity on the inner surface of the metal container depends on the distance between the high-voltage conductor and the inner surface of the metal container. Therefore, to suppress the floating height of the foreign substance, it is necessary to increase the size of the metal container. This becomes a factor in hindering the miniaturization of the closed insulating device.

There is, as a method of mitigating the influence by the foreign substances, a method of suppressing the movement of the foreign substances by coating the inner surface of the metal container with an insulation resistant material. By coating the inner surface of the metal container with the insulation resistant material, supply of electric charges from the inner surface of the metal container to the foreign substances is suppressed to make the foreign substances hard to move. In this case, the specific volume resistivity of the insulation resistant material for coating needs to be controlled to a specific volume resistivity capable of suppressing the movement of the foreign substances.

However, in the case of using a conventional insulation resistant material, electric field concentration is likely to occur at a portion composed of the foreign substance, the insulating gas, and the insulation resistant material. When the electric field concentration becomes larger, partial discharge occurs around the foreign substance and supplies electric charges to the foreign substance.

When the partial discharge occurs, the foreign substance suddenly moves in a wide range to affect the insulation performance. Besides, when an overvoltage such as lightning surge enters and thereby the electric field on the inner surface of the metal container becomes large, the electric field at the electric field concentrated portion sometimes becomes much larger, so that the foreign substance suddenly greatly moves around.

To suppress the sudden movement of the foreign substance around in a wide range, it is necessary to relax the electric field concentration between the insulation resistant material and the foreign substance to thereby suppress occurrence of partial discharge and field emission. Besides, a higher voltage such as a lightning impulse causes partial discharge to cause the foreign substance to start to move.

DETAILED DESCRIPTION

A coating material for electrical equipment in an embodiment includes a matrix resin composed of an epoxy resin, and a first filler dispersedly contained in the matrix resin and composed of whiskers having a semiconductive specific volume resistivity. The coating material for electrical equipment further includes a second filler dispersedly contained in the matrix resin and composed of particles having a semiconductive specific volume resistivity, and a third filler dispersedly contained in the matrix resin and composed of a planar, fibrous, or lamellar substance having insulating properties.

Hereinafter, an embodiment of the present invention will be described referring to the drawings.

A coating material for electrical equipment in the embodiment contains a first filler, a second filler, and a third filler which are dispersed in a matrix resin. The matrix resin is in a viscous liquid state and is cured by adding a curing agent thereto.

An epoxy resin is made of an epoxy compound having two or more epoxy groups per molecule. As the epoxy compound, any compound can be arbitrarily used as long as it has, in one molecule, two or more three-membered rings each composed of two carbon atoms and one oxygen atom and is curable, and its kind is not particularly limited.

Examples of the epoxy resin include: glycidyl ether type epoxy resins such as bisphenol A type epoxy resin, brominated bisphenol A type epoxy resin, hydrogenerated bisphenol A type epoxy resin, bisphenol F type epoxy resin, bisphenol S type epoxy resin, bisphenol AF type epoxy resin, biphenyl type epoxy resin, naphthalene type epoxy resin, fluorene type epoxy resin, novolac type epoxy resin, phenol-novolac type epoxy resin, orthocresol-novolac type epoxy resin, tris(hydroxyphenyl) methane type epoxy resin, and tetraphenylolethane type epoxy resin; glycidyl ester type epoxy resin obtained by condensation of epichlorohydrin and carboxylic acid; heterocyclic epoxy resins such as hydantoin type epoxy resin obtained by reaction of triglycidyl isocyanate or epichlorohydrin and hydantoins, and so on. Further, as the epoxy resin, any one kind of the above-described epoxy resins may be used or two or more kinds of them may be used in mixture.

The curing agent that cures the epoxy resin chemically reacts with the epoxy resin to thereby cure the epoxy resin. Any curing agent can be arbitrarily used as long as it cures the epoxy resin, and its kind is not particularly limited. As the curing agent, for example, an amine-based curing agent, an acid anhydride-based curing agent or the like can be used. As the amine-based curing agent, for example, ethylenediamine, polyamidoamine or the like can be used. As the acid anhydride-based curing agent, for example, phthalic anhydride, hexahydrophthalic anhydride, 4-methylhexahydrophthalic anhydride, tetrahydrophthalic anhydride, 4-methyltetrahydrophthalic anhydride, tetrabromophthalic anhydride or the like can be used.

In order to prevent generation of foam in the matrix resin or extinguish generated foam, a defoaming agent may be added to the matrix resin. The defoaming agent is not particularly limited, but a dimethyl silicone-based defoaming agent (for example, TSA720 (product name manufactured by Momentive Performance Materials Japan LLC.) or the like) can be used.

Further, in order to improve the workability in the case of coating a structural object with the coating material for electrical equipment using a brush or in the case of performing painting using an airless spray, a diluting solvent may be added to the matrix resin. As the diluting solvent, a quick-drying thinner (for example, a mixture made by mixing ethyl acetate and toluene at a mass ratio of 8:2) or the like can be used. In order to improve the above-described workability, the diluting solvent is preferably contained by 1 to 10 parts by mass with respect to 100 parts by mass of the epoxy resin.

Figure 1:
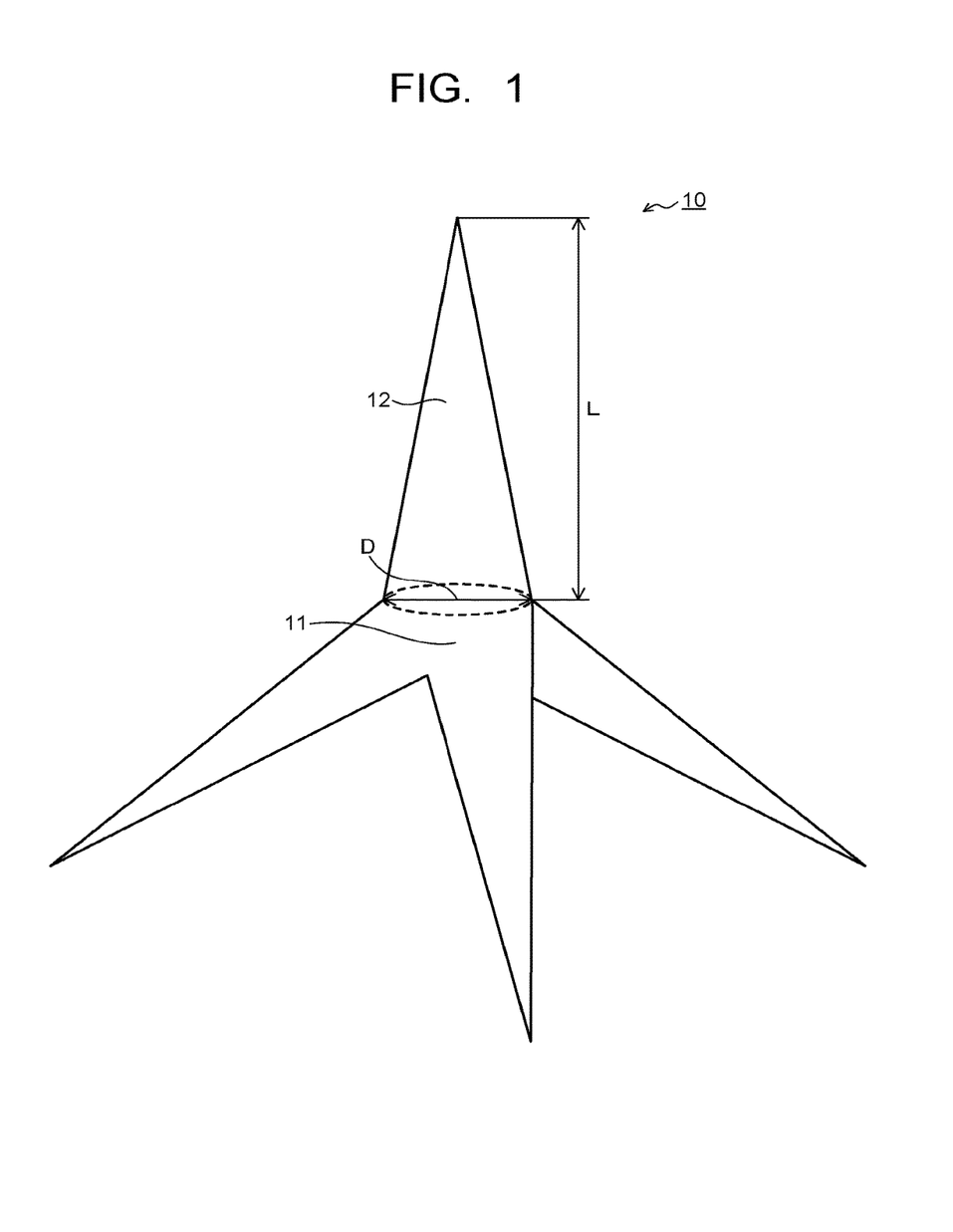
FIG. 1 is a perspective view schematically illustrating a first filler contained in a coating material for electrical equipment in an embodiment.

The first filler is composed of whiskers made of ZnO having a semiconductive specific volume resistivity. FIG. 1 is a perspective view schematically illustrating a first filler 10 contained in the coating material for electrical equipment in the embodiment.

The whisker constituting the first filler 10 is composed of, as illustrated in FIG. 1, a nucleus part 11 and needle crystal parts 12 extending from the nucleus part 11 in four axial directions, and has a tetrapod shape. The specific volume resistivity of the whisker is 1 to 5000 $\Omega \cdot cm$. Here, the semiconductive specific volume resistivity means a range of $1 \times 10^{-3}$ to $1 \times 10^{5}$ $\Omega \cdot cm$.

In the matrix resin, in order that the whisker couples the second fillers to form an excellent conductive path, a length L of the needle crystal part 12 of the whisker is preferably 2 μm to 50 μm and an average diameter D (arithmetic average diameter) of a portion having the maximum diameter of the needle crystal part 12 is preferably 0.2 μm to 3 μm. As the semiconductive whisker made of ZnO, for example, Pana-Tetra (manufactured by AMTEC Co., Ltd.) can be used.

The first filler 10 is preferably contained by 1 to 60 parts by mass with respect to 100 parts by mass of the matrix resin. Containing the first filler 10 in this range enables the first filler 10 to couple the second fillers in the matrix resin to thereby form an excellent conductive path so as to ensure the workability of painting or the like.

Here, the surface of the whisker may have been subjected to a titanate coupling treatment or a silane coupling treatment. By performing these treatments, the wettability with the matrix resin can be improved. The titanate coupling treatment is preferable irrespective of addition of the diluting solvent to the matrix resin. On the other hand, the silane coupling treatment is preferable in the case of adding no diluting solvent to the matrix resin.

As a titanate coupling agent used for the titanate coupling treatment, for example, isopropyl triisostearoyltite, isopropyl tridodecylbenzenesulfonyl titanate, isopropyl-tris(dioctylpyrophosphate) titanate, tetraisopropyl-bis(dioctylphosphite) titanate, tetraoctyl-bis(ditridecylphosphite) titanate, tetra(2,2-diallyloxymethyl-1-butyl)-bis(ditridecyl) phosphite titanate, bis(dioctylpyrophosphate) oxyacetate titanate or the like can be used.

As the titanate coupling treatment, for example, a method of mechanically mixing whiskers (surface-untreated product) made of ZnO together with the titanate coupling agent using a container capable of mixing powder can be used. Further, as the titanate coupling treatment, a method (integral blending method) of adding the titanate coupling agent when compounding whiskers (surface-untreated product) made of ZnO in a resin or the like can be used.

As a silane coupling agent used for the silane coupling treatment, for example, epoxysilane, aminosilane, vinylsilane, methacrylsilane, mercaptosilane, methoxysilane, ethoxysilane or the like can be used.

As the silane coupling treatment, for example, a method of mechanically mixing whiskers (surface-untreated product) made of ZnO together with the silane coupling agent using a container capable of mixing powder. Further, as the silane coupling treatment, for example, a method (integral blending method) of adding the silane coupling agent when compounding whiskers (surface-untreated product) made of ZnO in a resin or the like can be used.

The second filler is composed of particles having a semiconductive specific volume resistivity. Note that the semiconductive specific volume resistivity is as has been described above. The second filler is composed of, for example, particles made of $Fe_2O_3$ or $Fe_3O_4$.

First, $Fe_2O_3$ will be described. $Fe_2O_3$ (specific gravity: about 5.2 g/cm$^3$) is a red powder and is so-called colcothar. The specific volume resistivity of $Fe_2O_3$ is about $1\times10^3$ Ω·cm. The average particle size of $Fe_2O_3$ is preferably 0.1 μm to 1 μm in order to ensure the workability of painting or the like while developing insulation resistance characteristics in the coating material for electrical equipment. Further, for excellent insulation resistance characteristics, the average particle size of $Fe_2O_3$ is preferably 0.5 μm to 1 μm. Here, the insulation resistance characteristics mean representation of a value about $1\times10^6$ to $1\times10^{18}$ Ω·cm in terms of specific volume resistivity (the same applies hereafter).

Here, the average particle size is obtained by observing the cross section of a predetermined resin containing the second filler dispersed therein under a SEM (scanning electron microscope) and measuring the particle sizes of the individual second fillers and arithmetically averaging them.

$Fe_2O_3$ is preferably contained by 1 to 30 parts by mass with respect to 100 parts by mass of the matrix resin. Containing $Fe_2O_3$ in this range makes it possible to form a conductive path in the coating material for electrical equipment and ensure the workability of painting or the like.

Next, $Fe_3O_4$ will be described. $Fe_3O_4$ (specific gravity: about 5.2 g/cm$^3$) is a black powder. The specific volume resistivity of $Fe_3O_4$ is about $4\times10^{-3}$ Ω·cm. The average particle size of $Fe_3O_4$ is preferably 0.01 μm to 0.1 μm in order to ensure the workability of painting or the like while developing insulation resistance characteristics in the coating material for electrical equipment. Further, for excellent insulation resistance characteristics, the average particle size of $Fe_3O_4$ is preferably 0.05 μm to 0.08 μm. The average particle size can be obtained by the same method as in the case of using $Fe_2O_3$ as the second filler.

$Fe_3O_4$ is preferably contained by 1 to 30 parts by mass with respect to 100 parts by mass of the matrix resin. Containing $Fe_3O_4$ in this range makes it possible to form a conductive path in the coating material for electrical equipment and ensure the workability of painting or the like.

The third filler is composed of a planar, fibrous, or lamellar substance having insulating properties. The insulating properties here mean that the specific volume resistivity is about $1\times10^6$ to $1\times10^{18}$ Ω·cm.

First, the planar substance will be described. The planar third filler is made of, for example, talc or boron nitride (BN).

Talc is a planar compound containing a main component composed of MgO—SiO$_2$—H$_2$O. The specific volume resistivity of talc is about $1\times10^{14}$ to $1\times10^{15}$ Ω·cm. The boron nitride (BN) is a particle having a scale-like structure. The boron nitride is classified, depending the difference in crystal structure, into hexagonal boron nitride, rhombohedral boron nitride, cubic boron nitride, turbostratic structure boron nitride, and wurtzite boron nitride. Among them, hexagonal boron nitride being general boron nitride is preferably used because it has a large accept ratio and a high insulation resistance and can enhance the dielectric breakdown electric field of a material.

Here, in the case of using boron nitride as the planar third filler, the heat radiation characteristics can be improved, for example, in a coating layer composed of the coating material for electrical equipment because the boron nitride itself has high heat conductivity.

The average diameter of the planar substance is preferably 1 μm to 50 μm. Further, the average diameter of the planar substance is more preferably 10 μm to 30 μm. Note that when the planar substance does not form a circle, the average length of the longest straight line (hereinafter, referred to as an average straight line length) drawn over the surface of the planar substance only needs to fall within the above range. Setting the average diameter of the planar substance to this range allows the planar third filler to enter space between the first filler and the second filler to thereby uniformly disperse the first filler and the second filler in the matrix resin.

Here, the average diameter can be obtained by observing a resin cured product under a SEM (scanning electron microscope). The average straight line length can be obtained by similarly observing the resin cured product under a SEM (scanning electron microscope).

The planar third filler is preferably contained by 1 to 30 parts by mass with respect to 100 parts by mass of the matrix resin. Containing the planar third filler in this range makes it possible to optimally maintain the viscosity of the coating material for electrical equipment. Further, the planar third filler is preferably contained by 1 to 15 parts by mass with respect to 100 parts by mass of the matrix resin.

Next, the fibrous substance will be described. The fibrous third filler is composed of, for example, potassium titanate whiskers or glass milled fibers.

The average fiber length of the potassium titanate whiskers and glass milled fibers is preferably 1 μm to 50 μm and more preferably 10 μm to 20 μm. Setting the average fiber length of the fibrous substance to this range allows the fibrous third filler to enter space between the first filler and the second filler to thereby uniformly disperse the first filler and the second filler in the matrix resin.

Note that the average fiber length has been obtained by arithmetically averaging the lengths in the longitudinal direction of fibers. Here, the average fiber length can be obtained by observing the resin cured product under a SEM (scanning electron microscope).

The fibrous third filler is preferably contained by 1 to 60 parts by mass with respect to 100 parts by mass of the matrix resin. Containing the fibrous third filler in this range makes it possible to optimally maintain the viscosity of the coating material for electrical equipment. Further, the fibrous third filler is preferably contained by 1 to 30 parts by mass with respect to 100 parts by mass of the matrix resin.

Next, the lamellar substance will be described. The lamellar third filler is made of, for example, mica or smectite.

Mica is a kind of lamellar silicate mineral and a lamellar compound containing a main component composed of SiO$_2$, Al$_2$O$_3$, K$_2$O, and crystal water. Examples of mica include two kinds, namely, hard mica and soft mica. The specific volume resistivity of hard mica is about $1\times10^{12}$ to $1\times10^{15}$ Ω·cm. The specific volume resistivity of soft mica is about $1\times10^{10}$ to $1\times10^{13}$ Ω·cm. These kinds of mica exhibit similar properties in the coating material for electrical equipment in the embodiment and therefore will be described with no distinction therebetween hereinafter.

The average diameter or the average straight line length of mica and smectite is preferably 0.1 μm to 2 μm and more preferably 0.5 μm to 1 μm. Setting the average diameter or the average straight line length of the lamellar substance to this range allows the lamellar third filler to enter space between the first filler and the second filler to thereby uniformly disperse the first filler and the second filler in the matrix resin.

The lamellar third filler is preferably contained by 1 to 30 parts by mass with respect to 100 parts by mass of the matrix resin. Containing the lamellar third filler in this range makes it possible to optimally maintain the viscosity of the coating material for electrical equipment. Further, the lamellar third filler is preferably contained by 1 to 15 parts by mass with respect to 100 parts by mass of the matrix resin.

Figure 2:
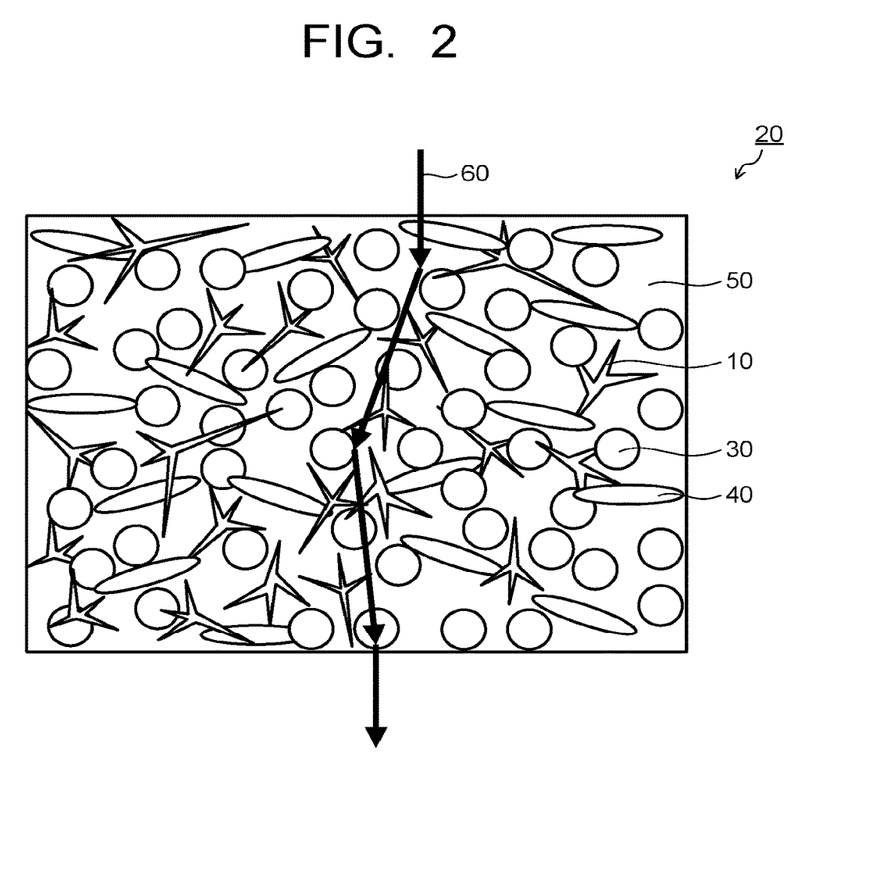
FIG. 2 is a view schematically illustrating a configuration of the coating material for electrical equipment in the embodiment for explaining a conductive path formed by the first filler and a second filler.

Here, FIG. 2 is a view schematically illustrating a configuration of a coating material for electrical equipment 20 in the embodiment for explaining a conductive path 60 formed by the first filler 10 and the second filler 30.

As illustrated in FIG. 2, the third filler 40 enters space between the first filler 10 and the second filler 30 to uniformly disperse the first filler 10 and the second filler 30 in a matrix resin 50. This makes it possible to improve the insulation resistance characteristics exhibited by the first filler 10. Further, the particles of the second filler 30 come into contact with the first filler 10 to form the three-dimensional conductive path 60.

Further, the first filler 10 and the second filler 30 are uniformly dispersed in the matrix resin 50, whereby the first filler 10 and the second filler 30 are uniformly arrayed in the coating layer composed, for example, of the coating material for electrical equipment. Therefore, the conductive path 60 formed by the first filler 10 and the second filler 30 can be lengthened. This makes it possible to form a stable and long conductive path 60 even when the coating layer is thick and has irregularities. Accordingly, the electric field concentrated between the coating layer and foreign substances can be relaxed.

Uniformly dispersing the first filler 10, the second filler 30, and the third filler 40 in the matrix resin 50 as described above makes it possible to ensure an excellent conductive path and obtain a high foreign substance floating electric field. The foreign substance floating electric field means an electric field with which foreign substances start to float, and with a higher value, floating and moving around of the foreign substances in electrical equipment can be further suppressed.

Here, one of reasons why the high foreign substance floating electric field can be obtained can be the conductive path 60 created by electrically connecting the first filler 10 and the second filler 30.

In the case of forming the conductive path 60 only by adding the first filler 10, end portions of the first filler 10 need to be located close to each other. However, this is difficult when considering the thickness of the coating layer and the size of the first filler 10. Hence, the second filler 30 can be added to surely form the conductive path 60.

Next, in the case of adding only the second filler 30, it is difficult to form the conductive path 60 even if the second filler 30 is uniformly dispersed, because the second filler 30 is particulate and has a small particle size. When the content of the second filler 30 is increased, the viscosity increases to decrease the workability. Also in the case where the diluting solvent is added, when the content of the second filler 30 is increased, the viscosity similarly increases. Besides, when the particle size of the second filler 30 is increased, the second filler 30 cannot be uniformly dispersed, resulting in difficult in forming the conductive path 60.

From these reasons, the first filler 10 and the second filler 30 need to be added at the same time and by appropriate contents.

Further, the first filler 10 and the second filler 30 having different shapes are contained to form a packing structure in which they are dense to each other. This can form the conductive path 60. Here, the specific volume resistivities of the first filler 10 and the second filler 30 are need to approximate and semiconductive. This is because if their specific volume resistivities are greatly different, a dielectric breakdown occurs at their end portions close to each other. Here, the specific volume resistivity of a semiconductive region is in an antistatic region and is therefore suitable also for preventing foreign substances from being charged.

Next, the necessity for the third filler 40 to be contained will be described. In manufacture of the coating material for electrical equipment 20, for example, the needle crystal part 12 or the like of the first filler 10 is sometimes broken during a stirring process. Even in this case, the third filler 40 having insulating properties contained therein supports the broken part. This makes it possible to form the conductive path 60. On the other hand, even in the case where the first filler 10 is not broken, the first filler 10 supported by the third filler 40 can surely form the conductive path.

Next, a method for manufacturing the coating material for electrical equipment 20 in the embodiment will be described.

First, part of the epoxy resin to be compounded (for example, about 10 to 50 mass % of the total compounding amount of the epoxy resin) and a predetermined amount of the first filler 10 are stirred by a rotation and revolution mixer or the like to produce a masterbatch.

Subsequently, the remainder of the epoxy resin and a predetermined amount of the second filler 30 and a predetermined amount of the third filler 40 are added to the masterbatch, and they are stirred by the rotation and revolution mixer or the like.

Through the processes, the coating material for electrical equipment 20 is manufactured.

Here, in the case of adding the defoaming agent, the defoaming agent is added when the masterbatch is produced. In the case of adding the diluting solvent and the curing agent, the diluting solvent and the curing agent are added at the time when the remainder of the epoxy resin, the second filler 30, and the third filler 40 are added to the masterbatch.

As described above, the masterbatch containing the first filler 10 is produced first, and then the remaining constituent is mixed into the masterbatch, whereby the first filler 10, the second filler 30, and the third filler 40 can be uniformly dispersed in the matrix resin 50. Thus, an excellent conductive path 60 can be formed.

Besides, the coating material for electrical equipment 20 in the embodiment may be manufactured as follows.

First, part of the epoxy resin to be compounded, a predetermined amount of the first filler 10, a predetermined amount of the second filler 30, and a predetermined amount of the third filler 40 are stirred by a rotation and revolution mixer or the like together with stirring particles having a size (particle size) larger than the sizes of the fillers to form a first mixture. Here, the stirring particle is composed of, for example, a glass particle.

Subsequently, the remainder of the epoxy resin is added to the first mixture, and they are stirred to form a second mixture. Here, the first mixture and the remainder of the epoxy resin are stirred using, for example, a stirring blade.

Subsequently, the second mixture is filtrated to separate the stirring particles. Note that other than the stirring particles pass through a filter for filtration in this event.

Through the processes, the coating material for electrical equipment 20 is manufactured.

Here, in the case of adding the defoaming agent, the defoaming agent is added at the time when forming the first mixture. In the case of adding the diluting solvent and the curing agent, the diluting solvent and the curing agent are added after the filtration of the second mixture, and then stirred.

Stirring together with the stirring particles as described above enables stirring with high shearing applied thereon. This makes it possible to disperse the fillers which are likely to aggregate, while loosening them. Therefore, the first filler 10, the second filler 30, and the third filler 40 can be uniformly dispersed in the matrix resin 50. Thus, an excellent conductive path 60 can be formed.

The coating material for electrical equipment 20 produced as described above is cast into, for example, a mold and molded, and left as it is for a predetermined time to be cured, whereby a cast cured product can be manufactured. Further, the coating material for electrical equipment 20 is applied to a structural object using a brush or the like and left as it is for a predetermined time to be cured, whereby a coating layer (film) can be formed.

Further, in the case where the diluting solvent is added to the coating material for electrical equipment 20, its viscosity decreases. Therefore, the coating material for electrical equipment 20 is sprayed to the structural object using, for example, an airless spray or the like and left as it is for a predetermined time to be cured, whereby the coating layer can be formed.

Note that at the time when forming the coating layer, a thicker coating layer is better from a viewpoint of development of the insulation resistance characteristics. The thickness of the coating layer has an upper limit value of about 500 µm from a viewpoint of the workability at the time when forming the coating layer.

Figure 3:
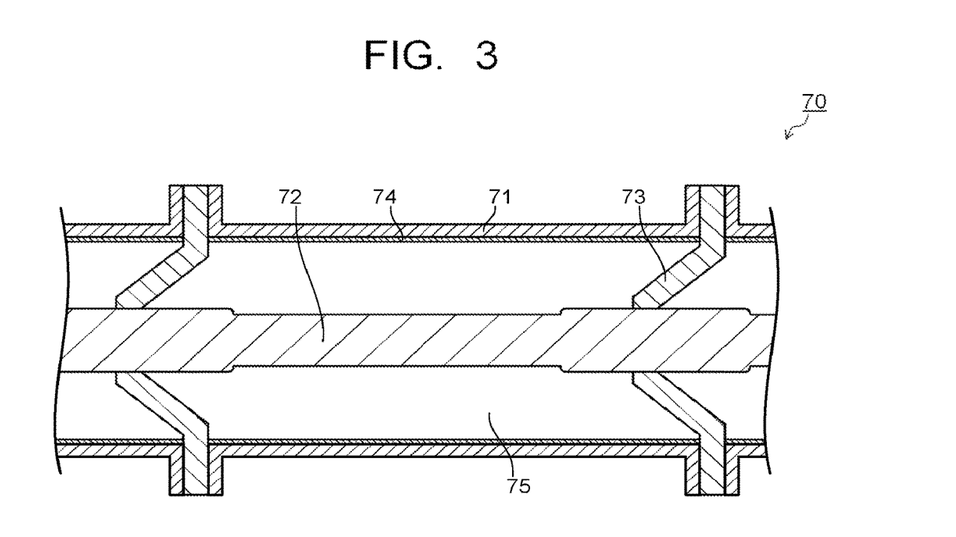
FIG. 3 is a view illustrating electric equipment formed with a coating layer using the coating material for electrical equipment in the embodiment with a part thereof illustrated in a cross section.

FIG. 3 is a view illustrating electric equipment formed with a coating layer 74 using the coating material for electrical equipment 20 in the embodiment with a part thereof illustrated in a cross section. Note that FIG. 3 illustrates a closed insulating device 70 as an example of the electric equipment.

As illustrated in FIG. 3, the closed insulating device 70 includes a cylindrical metal container 71 which can be divided into a plurality parts in an axial direction, a high-voltage conductor 72 which is extended in the axial direction at the center, and a spacer 73 provided between the metal containers 71.

The metal container 71 is constituted to cover the periphery of the high-voltage conductor 72 with a predetermined gap from the high-voltage conductor 72. The spacer 73 is disposed to divide the space inside the metal container 71 in the axial direction. At the center of the spacer 73, a through hole is formed, and the high-voltage conductor 72 penetrates the through hole. As described above, the high-voltage conductor 72 is supported by the spacer 73.

The coating layer 74 composed of the coating material for electrical equipment 20 in the embodiment is formed on an inner wall surface of the metal container 71. Inside the metal container 71, an insulating gas 75 such as a $SF_6$ gas is sealed.

Provision of the coating layer 74 composed of the coating material for electrical equipment 20 by which excellent insulation resistance characteristics can be obtained, on the inner wall surface of the metal container 71 makes it possible to suppress the movement of foreign substances existing on the surface of the coating layer 74. Therefore, it becomes possible to make the design electric field of the metal container larger than that of a conventional closed insulating device and thereby make the metal container 71 compact.

Note that though the closed insulating device has been illustrated and described as an example of the electric equipment here, the coating material for electrical equipment 20 in the embodiment is applicable, for example, to various kinds of electric equipment, electronic equipment, industrial equipment, and heavy electrical equipment. The same operations and effects as described above can be obtained also in the case of applying the coating material for electrical equipment 20 to them.

As described above, with the coating material for electrical equipment 20 in the embodiment, uniformly dispersing the first filler 10, the second first filler 30, and the third first filler 40 in the matrix resin 50 makes it possible to form an excellent conductive path 60. Further, with the coating material for electrical equipment 20, a high foreign substance floating electric field can be obtained to suppress floating and moving around of the foreign substances in electrical equipment.

(Evaluation of the Foreign Substance Floating Electric Field)

Next, the fact that the coating material for electrical equipment in the embodiment has an effect to suppress floating and moving around of the foreign substances in electrical equipment will be described.

For evaluation of the foreign substance floating electric field, the coating material for electrical equipment 20 was produced as follows.

First, part of the epoxy resin to be compounded (about 50 mass % of the total compounding amount of the epoxy resin) and predetermined parts by mass of the first filler 10 to 100 parts by mass of the epoxy resin (the total compounding amount of the epoxy resin) were stirred by a rotation and revolution mixer to produce a masterbatch. Here, a bisphenol A type epoxy resin (product name: EPOFIX) was used as the epoxy resin.

Note that in this event, an appropriate amount of a dimethyl silicone-based (product name: TSA720) defoaming agent was added. Further, as the whisker being the first filler 10, the one having a length L of the needle crystal part 12 of 2 µm to 50 µm and an average diameter D of a portion having the maximum diameter of the needle crystal part 12 of 3 µm was used.

Subsequently, the remainder of the epoxy resin and predetermined amounts of the second filler 30 and the third filler 40 were added to the masterbatch, and they were stirred by a rotation and revolution mixer. In this event, a predetermined amount of the curing agent (a curing agent for bisphenol A type epoxy resin (product name: EPOFIX HARDNER)) that cures the epoxy resin was added.

In the above manner, a plurality of coating materials for electrical equipment 20 (Sample 1 to Sample 36) were produced. Table 1 lists the material and parts by mass of each filler added to 100 parts by mass of the epoxy resin (the total compounding amount of the epoxy resin).

TABLE 1

|  | First Filler | Content of First Filler, parts by mass | Second Filler | Content of Second Filler, parts by mass | Third Filler | Content of Third Filler, parts by mass | Foreign Substance Floating Electric Field kVrms/mm |
|---|---|---|---|---|---|---|---|
| Sample 1 | ZnO Whisker | 0 | $Fe_2O_3$ | 10 | Talc | 10 | 2.0 |
| Sample 2 | ZnO Whisker | 5 | $Fe_2O_3$ | 10 | Talc | 10 | 3.7 |
| Sample 3 | ZnO Whisker | 10 | $Fe_3O_4$ | 10 | Boron Nitride | 10 | 2.6 |
| Sample 4 | ZnO Whisker | 5 | $Fe_2O_3$ | 10 | Talc | 0 | 1.9 |
| Sample 5 | ZnO Whisker | 5 | $Fe_2O_3$ | 10 | Talc | 5 | 3.8 |
| Sample 6 | ZnO Whisker | 5 | $Fe_2O_3$ | 10 | Boron Nitride | 15 | 2.7 |
| Sample 7 | ZnO Whisker | 5 | $Fe_3O_4$ | 0 | Boron Nitride | 10 | 2.0 |

TABLE 1-continued

| | First Filler | Content of First Filler, parts by mass | Second Filler | Content of Second Filler, parts by mass | Third Filler | Content of Third Filler, parts by mass | Foreign Substance Floating Electric Field kVrms/mm |
|---|---|---|---|---|---|---|---|
| Sample 8 | ZnO Whisker | 5 | $Fe_3O_4$ | 5 | Talc | 10 | 3.9 |
| Sample 9 | ZnO Whisker | 5 | $Fe_2O_3$ | 15 | Talc | 10 | 2.8 |
| Sample 10 | ZnO Whisker | 5 | $Fe_2O_3$ | 0 | Talc | 0 | 0.8 |
| Sample 11 | ZnO Whisker | 0 | $Fe_3O_4$ | 10 | Boron Nitride | 0 | 1.1 |
| Sample 12 | ZnO Whisker | 0 | $Fe_2O_3$ | 0 | Talc | 10 | 1.0 |
| Sample 13 | ZnO Whisker | 0 | $Fe_2O_3$ | 10 | Potassium Titanate Whisker | 20 | 2.1 |
| Sample 14 | ZnO Whisker | 5 | $Fe_2O_3$ | 10 | Glass Milled Fiber | 20 | 3.5 |
| Sample 15 | ZnO Whisker | 10 | $Fe_3O_4$ | 10 | Glass Milled Fiber | 20 | 2.4 |
| Sample 16 | ZnO Whisker | 5 | $Fe_2O_3$ | 10 | Glass Milled Fiber | 0 | 1.8 |
| Sample 17 | ZnO Whisker | 5 | $Fe_2O_3$ | 10 | Potassium Titanate Whisker | 15 | 3.5 |
| Sample 18 | ZnO Whisker | 5 | $Fe_3O_4$ | 10 | Glass Milled Fiber | 30 | 2.8 |
| Sample 19 | ZnO Whisker | 5 | $Fe_3O_4$ | 0 | Glass Milled Fiber | 20 | 1.9 |
| Sample 20 | ZnO Whisker | 5 | $Fe_2O_3$ | 5 | Potassium Titanate Whisker | 20 | 3.6 |
| Sample 21 | ZnO Whisker | 5 | $Fe_2O_3$ | 15 | Glass Milled Fiber | 20 | 2.5 |
| Sample 22 | ZnO Whisker | 5 | $Fe_3O_4$ | 0 | Potassium Titanate Whisker | 0 | 0.9 |
| Sample 23 | ZnO Whisker | 0 | $Fe_2O_3$ | 10 | Glass Milled Fiber | 0 | 1.2 |
| Sample 24 | ZnO Whisker | 0 | $Fe_3O_4$ | 0 | Glass Milled Fiber | 20 | 1.1 |
| Sample 25 | ZnO Whisker | 5 | $Fe_2O_3$ | 0 | Mica | 10 | 2.0 |
| Sample 26 | ZnO Whisker | 5 | $Fe_2O_3$ | 5 | Smectite | 10 | 3.6 |
| Sample 27 | ZnO Whisker | 5 | $Fe_3O_4$ | 15 | Mica | 10 | 2.5 |
| Sample 28 | ZnO Whisker | 0 | $Fe_3O_4$ | 10 | Smectite | 10 | 1.9 |
| Sample 29 | ZnO Whisker | 5 | $Fe_2O_3$ | 10 | Mica | 10 | 3.7 |
| Sample 30 | ZnO Whisker | 10 | $Fe_2O_3$ | 10 | Mica | 10 | 2.6 |
| Sample 31 | ZnO Whisker | 5 | $Fe_2O_3$ | 10 | Smectite | 0 | 1.8 |
| Sample 32 | ZnO Whisker | 5 | $Fe_2O_3$ | 10 | Smectite | 5 | 3.5 |
| Sample 33 | ZnO Whisker | 5 | $Fe_3O_4$ | 10 | Smectite | 15 | 2.5 |
| Sample 34 | ZnO Whisker | 5 | $Fe_3O_4$ | 0 | Mica | 0 | 0.7 |
| Sample 35 | ZnO Whisker | 0 | $Fe_3O_4$ | 10 | Smectite | 0 | 0.8 |
| Sample 36 | ZnO Whisker | 0 | $Fe_2O_3$ | 0 | Mica | 10 | 0.5 |

Here, as $Fe_2O_3$ of the second filler 30, the one having an average particle size of 0.8 μm was used. As $Fe_3O_4$ of the second filler 30, the one having an average particle size of 0.06 μm was used. As talc of the third filler 40, the one having an average straight line length of 10 μm was used. As boron nitride of the third filler 40, the one having an average straight line length of 10 μm was used. As the potassium titanate whisker of the third filler 40, the one having an average fiber length of 10 μm was used. As the glass milled fiber of the third filler 40, the one having an average fiber length of 15 μm was used. As mica of the third filler 40, the one having an average straight line length of 1 μm was used. As smectite of the third filler 40, the one having an average straight line length of 1 μm was used.

Next, a test device evaluated the foreign substance floating electric field using the above-described samples will be described.

Figure 4:
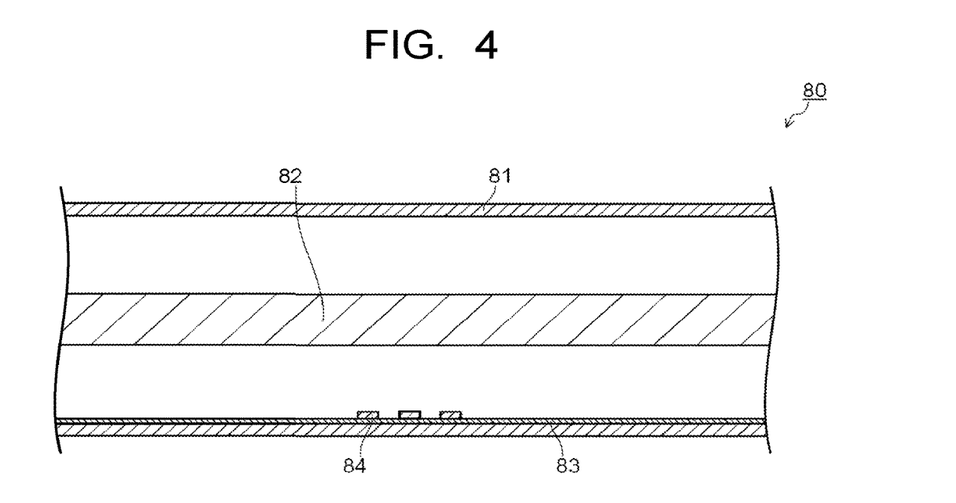
FIG. 4 is a view illustrating a cross section of a test device evaluated a foreign substance floating electric field.

FIG. 4 is a view illustrating a cross section of a test device 80 evaluated the foreign substance floating electric field. As illustrated in FIG. 4, the test device 80 includes a metal container 81 made of aluminum and having an inner diameter of 254 mm, and a high-voltage conductor 82 having a diameter of 154 mm disposed at the center of the metal container 81. Note that the high-voltage conductor 82 was installed so that the center axes of the metal container 81 and the high-voltage conductor 82 were located on the same axis.

On the inner wall surface of a lower half part of the metal container 81, the coating material for electrical equipment 20 (Sample 1 to Sample 36) was applied. Then, it was subjected to forced drying (80° C., 30 minutes) in a drying furnace to form a coating layer 83. More specifically, 36 kinds of metal containers 81 in which the coating layers 83 were formed by applying Sample 1 to Sample 36 respectively, were prepared. The thickness of each of the coating layers 83 was set to 100 μm.

On the coating layer 83, six metallic foreign substances 84 made of aluminum (a diameter of 0.25 mm, a length of 3 mm) were placed. Then, a $SF_6$ gas (0.4 MPa) was filled in the metal container 81.

In the evaluation test for the foreign substance floating electric field, an electric field was applied to the high-voltage conductor 82. The electric field to be applied was set to 0.6 kVrms/mm to 4.0 kVrms/mm of alternating current (AC). The electric field to be applied was increased by 0.2 kVrms/mm per minute. Then, the electric field with which any of the metallic foreign substances 84 floated up first was regarded as the foreign substance floating electric field. The measurement was carried out five times for each of the samples.

Table 1 lists measurement results of the foreign substance floating electric fields in the samples. Note that the results listed in Table 1 are obtained by arithmetically averaging the results of measurements of five times.

As listed in Table 1, high foreign substance floating electric fields were obtained in Samples containing predetermined amounts in the ranges of the embodiment of the first filler 10, the second filler 30, and the third filler 40 (Sample 2, Sample 3, Sample 5, Sample 6, Sample 8, Sample 9, Sample 14, Sample 15, Sample 17, Sample 18, Sample 20, Sample 21, Sample 26, Sample 27, Sample 29, Sample 30, Sample 32, Sample 33).

According to the above-described embodiment, it becomes possible to suppress floating and moving around of foreign substances in electrical equipment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The inventions described in the claims and their equivalents are intended to cover such embodiments or modifications as would fall within the scope and spirit of the inventions.

What is claimed is:

1. A coating material for electrical equipment, comprising:
   a matrix resin composed of an epoxy resin;
   a first filler dispersedly contained in the matrix resin and composed of whiskers having a semiconductive specific volume resistivity, each of the whiskers being made of ZnO, each of the whiskers having a tetrapod shape provided with a nucleus part and needle crystal parts extending from the nucleus part in four axial directions;
   a second filler dispersedly contained in the matrix resin and composed of particles having a semiconductive specific volume resistivity, the second filler being made of $Fe_2O_3$ or $Fe_3O_4$; and
   a third filler dispersedly contained in the matrix resin and composed of a planar, fibrous, or lamellar substance having insulating properties,
   wherein the semiconductive specific volume resistivity of the whiskers of the first filler means a range of $1\times10^{-3}$ to $1\times10^5$ $\Omega\cdot cm$,
   wherein the insulating properties mean a specific volume resistivity in a range of $1\times10^6$ to $1\times10^{18}$ $\Omega\cdot cm$,
   wherein the third filler enters space between the first filler and the second filler to thereby disperse the first filler and the second filler in the matrix resin,
   wherein the particles of the second filler come into contact with the first filler to form a three-dimensional conductive path.

2. The coating material for electrical equipment according to claim 1,
   wherein the planar third filler is made of talc or boron nitride.

3. The coating material for electrical equipment according to claim 1,
   wherein the fibrous third filler is composed of potassium titanate whiskers or glass milled fibers.

4. The coating material for electrical equipment according to claim 1,
   wherein the lamellar third filler is made of mica or smectite.

5. The coating material for electrical equipment according to claim 1,
   wherein a surface of each of the whiskers constituting the first filler has been subjected to a titanate coupling treatment.

6. The coating material for electrical equipment according to claim 1,
   wherein the first filler is contained by 1 to 60 parts by mass with respect to 100 parts by mass of the matrix resin.

7. The coating material for electrical equipment according to claim 1,
   wherein a curing agent that cures the matrix resin is added.

8. The coating material for electrical equipment according to claim 1,
   wherein the matrix resin further contains a diluting solvent.

9. A closed insulating device, comprising:
   a conductor extended in one direction;
   a metal container covering a periphery of the conductor with a predetermined gap from the conductor, and filled with an insulating gas; and
   a coating layer composed of the coating material for electrical equipment according to claim 1 formed on an inner wall surface of the metal container.

* * * * *